(12) United States Patent
Li et al.

(10) Patent No.: US 10,767,106 B2
(45) Date of Patent: Sep. 8, 2020

(54) VISCOSITY REDUCTION SYSTEM FOR MICROWAVE EXTRACTION OF HEAVY OIL AND PREPARATION METHOD THEREOF

(71) Applicant: CHINA UNIVERSITY OF PETROLEUM, Qingdao (CN)

(72) Inventors: Zhaomin Li, Qingdao (CN); Zhengxiao Xu, Qingdao (CN); Teng Lu, Qingdao (CN); Mingxuan Wu, Qingdao (CN); Xinru Zhao, Qingdao (CN); Aiwen Jing, Qingdao (CN)

(73) Assignee: CHINA UNIVERSITY OF PETROLEUM, Qingdao (CN)

(*) Notice: Subject to any disclaimer, the term of this patent is extended or adjusted under 35 U.S.C. 154(b) by 0 days.

(21) Appl. No.: 16/813,581

(22) Filed: Mar. 9, 2020

(65) Prior Publication Data

US 2020/0208042 A1 Jul. 2, 2020

Related U.S. Application Data

(63) Continuation of application No. PCT/CN2019/097204, filed on Jul. 23, 2019.

(30) Foreign Application Priority Data

Apr. 12, 2019 (CN) .......................... 2019 1 0293536

(51) Int. Cl.
| | | |
|---|---|---|
| *C09K 8/592* | (2006.01) | |
| *C09K 8/584* | (2006.01) | |
| *H01F 1/00* | (2006.01) | |
| *E21B 43/24* | (2006.01) | |

(52) U.S. Cl.
CPC .............. *C09K 8/592* (2013.01); *C09K 8/584* (2013.01); *H01F 1/0063* (2013.01); *E21B 43/24* (2013.01)

(58) Field of Classification Search
CPC ........ C09K 8/592; E21B 43/24; H01F 1/0063
See application file for complete search history.

(56) References Cited

U.S. PATENT DOCUMENTS

| | | | | |
|---|---|---|---|---|
| 10,149,862 B2* | 12/2018 | Alsharaeh | ............ | A61K 31/704 |
| 2014/0044890 A1* | 2/2014 | Ling | ...................... | B82Y 40/00 |
| | | | | 427/595 |
| 2019/0001307 A1* | 1/2019 | Kinoshita | .............. | B01J 19/127 |

* cited by examiner

*Primary Examiner* — C Melissa Koslow
(74) *Attorney, Agent, or Firm* — CBM Patent Consulting, LLC

(57) ABSTRACT

Disclosed belongs to the technical field of heavy oil extraction, and specifically relates to a viscosity reduction system for microwave extraction of heavy oil and a preparation method thereof. The viscosity reduction system is a magnetic graphene oxide. The viscosity reduction system added to heavy oil has a significant viscosity reduction effect after microwave treatment. The viscosity reduction system exhibits lipophilicity and can be adsorbed on oil droplets, so that the thermal effect of microwaves assisted by the viscosity reduction system mainly acts on a reservoir, which reduces heat loss during heat transfer. At the same time, the viscosity reduction system is magnetic, which helps directional regulation and separation under the action of a magnetic field.

7 Claims, 6 Drawing Sheets

VISCOSITY REDUCTION SYSTEM FOR MICROWAVE EXTRACTION OF HEAVY OIL AND PREPARATION METHOD THEREOF

FIELD OF THE INVENTION

The present invention belongs to the technical field of heavy oil extraction, and specifically relates to a viscosity reduction system for microwave extraction of heavy oil and a preparation method thereof.

BACKGROUND OF THE INVENTION

Heavy oil refers to heavy oil having a viscosity of more than 50 mPa·s under reservoir conditions or a degassed viscosity of more than 100 mPa·s at reservoir temperatures, and a relative density of more than 0.92. China's heavy oil reservoirs are mainly medium-deep and extra-deep reservoirs, and the heavy oil covers ordinary heavy oil, extra-heavy oil and ultra-heavy oil according to the classification of viscosity. Moreover, the types of reservoirs are diverse, and the oil-water relationship is complex, so the thermal extraction is relatively difficult. Accordingly, a microwave oil extraction technology emerged. In the process of microwave oil extraction, nano-catalysts are often used to assist microwaves in modifying the nature and reducing the viscosity of heavy oil. However, the existing nano-catalysts are difficult to disperse in strata and cannot effectively reduce the viscosity of reservoirs.

SUMMARY OF THE INVENTION

The present invention aims to provide a viscosity reduction system for microwave extraction of heavy oil and a preparation method thereof, aiming at the problem that the existing nano-catalysts have poor dispersion when applied to microwave extraction of heavy oil and cannot effectively reduce the viscosity of reservoirs. The viscosity reduction system added to heavy oil has a significant viscosity reduction effect after microwave treatment. The viscosity reduction system exhibits lipophilicity and can be adsorbed on oil droplets, so that the thermal effect of microwaves assisted by the viscosity reduction system mainly acts on a reservoir, which reduces heat loss during heat transfer. At the same time, the viscosity reduction system is magnetic, which helps directional regulation and separation under the action of a magnetic field.

The technical solution of the present invention is: a viscosity reduction system for microwave extraction of heavy oil, the viscosity reduction system being a magnetic graphene oxide.

The magnetic graphene oxide is compounded by $Fe_3O_4$ nanospheres and a graphene oxide.

The mass ratio of the $Fe_3O_4$ nanospheres to the graphene oxide is 2:1.

The diameter of the $Fe_3O_4$ nanospheres is 10 to 20 nm.

The graphene oxide has 1 to 2 layers and a diameter of 1 to 5 μm.

A preparation method of the viscosity reduction system for microwave extraction of heavy oil, including the following steps:

(1) preparing a catalyst suspension: adding $Fe_3O_4$ nanospheres into deionized water to obtain a suspension, and adjusting the suspension to be acidic by an acid to obtain a catalyst suspension;

(2) preparing a carrier solution: adding graphene oxide into deionized water, and stirring to obtain a graphene oxide carrier solution;

(3) placing the catalyst suspension obtained in step (1) in a flask, introducing nitrogen into the flask, and heating in a constant temperature water bath of 60° C.;

(4) adding the graphene oxide carrier solution into the flask heated in the constant temperature water bath of step (3) dropwise while stirring to obtain a mixed solution; wherein the weight ratio of the graphene oxide carrier solution to the catalyst suspension is 1:2;

(5) placing the mixed solution obtained in step (4) in an infiltration bag to obtain a magnetic graphene oxide precipitate; and (6) placing the magnetic graphene oxide precipitate obtained in step (5) in a vacuum oven for drying to obtain the viscosity reduction system.

In step (1), the $Fe_3O_4$ nanospheres are 0.4 to 1 g, and the deionized water is 200 mL; in step (2), the graphene oxide is 0.2 to 0.5 g, and the deionized water is 100 mL; and in step (4) the graphene oxide carrier solution is 100 parts by weight, and the catalyst suspension is 200 parts by weight.

In step (1), the $Fe_3O_4$ nanospheres are 0.5 g; and in step (2), the graphene oxide is 0.25 g.

In step (1), the pH value of the suspension is adjusted to 3 to 5 by 1 mol/L hydrochloric acid.

The stirring in step (2) is magnetic stirring, wherein the revolving speed is 400 to 600 rpm, the stirring time is 0.5 to 1 h, and the stirring temperature is 20 to 30° C.; the flask in step (3) is a three-necked flask, and the inflow rate of nitrogen is 0.3 to 0.5 L/min; the stirring in step (4) is intense stirring, and the revolving speed is 800 to 1200 rpm; and vacuum drying is performed at 50° C. in step (6).

Beneficial effects of the invention: the viscosity reduction system for microwave extraction of heavy oil is a magnetic graphene oxide, and the magnetic graphene oxide is obtained by loading magnetic $Fe_3O_4$ nanospheres to a graphene oxide, wherein the graphene oxide can enhance the dispersion of $Fe_3O_4$ nanospheres, and moreover, after the graphene oxide is reduced to grapheme, the wave absorption and lipophilicity are enhanced, which can help heat transfer and search for oil automatically.

During reservoir production, water is often used as a working fluid and injected into a reservoir for displacement, while $Fe_3O_4$ nanospheres with good wave absorption are not easily dispersed in water, so graphene oxide with large specific surface area and good hydrophilicity is used as a carrier to enhance the dispersion. The graphene oxide has poor wave absorption, but the $Fe_3O_4$ nanospheres supported on the graphene oxide have strong wave absorption, the nanospheres are quickly heated under microwave radiation, a local high temperature occurs near the nanospheres, and the heat is transferred to the graphene oxide and surrounding contacted heavy oil, so that oxygen-containing groups of the graphene oxide fall off, and the graphene oxide is reduced to graphene with strong wave absorption. The graphene exhibits lipophilicity and can be spontaneously adsorbed on the heavy oil to achieve a good dispersion effect in the reservoir, and assists the nano-catalyst $Fe_3O_4$ in absorbing microwaves to transfer heat to the heavy oil, so that the thermal effect of the nano-catalyst assisted microwaves mainly acts on the reservoir, which reduces the heat loss during heat transfer. Part of heavy components such as colloid and asphaltene in the heavy oil generate light components such as saturated and aromatic components through hydrogenation and chain scission reaction under superheated conditions, thereby reducing the viscosity of the heavy oil. At the same time, the magnetic material helps directional control and separation under the action of a magnetic field.

XPS is used to verify the reduction of graphene oxide to graphene, and the results are shown in Table 1. From the elemental analysis table, it can be seen that the C/O of MGO is relatively low, which is due to the increase of Fe and 0 elements after loading the $Fe_3O_4$ nanospheres. After microwave treatment at a frequency of 2450 MHz and a power of 700 W for 10 min, the C/O ratio in MGO increases, because $Fe_3O_4$ nanospheres have strong wave absorption after GO is loaded with the $Fe_3O_4$ nanospheres, a local hot zone is formed on the surface of GO under microwave radiation, the high temperature accelerates deoxidation of GO to generate graphene (RGO), and the graphene exhibits better wave absorption and lipophilicity than the graphene oxide.

TABLE 1

Elemental analysis table before and after microwave treatment

| Material | C % | O % | Fe % | Total content % | C/O ratio |
|---|---|---|---|---|---|
| GO | 64.71 | 35.29 | 0 | 100 | 1.83 |
| MGO | 53.40 | 39.74 | 6.86 | 100 | 1.34 |
| MGO after microwave treatment | 61.26 | 32.24 | 6.50 | 100 | 1.90 |

In the process of microwave extraction of heavy oil, the existing nano-catalyst is added together with a hydrogen donor to assist microwaves in modifying the nature and reducing the viscosity of heavy oil. The viscosity reduction system of the present invention not only has a significant viscosity reduction effect on heavy oil after assisting in microwave treatment, but also has a more significant viscosity reduction effect under the cooperation of the hydrogen donor than the existing nano-catalyst, as shown in FIG. 6.

During the preparation of the viscosity reduction system, the suspension is adjusted to be acidic, and mixed with the graphene oxide carrier solution under the acidic condition for reacting, because the zeta potentials of the two materials are opposite under the acidic condition, the surface of the $Fe_3O_4$ nanospheres carries positive charges, the surface of the graphene oxide carries negative charges, and the two materials are self-assembled according to the principle of mutual attraction of opposite charges.

DETAILED DESCRIPTION OF THE EMBODIMENTS

Figure 1:
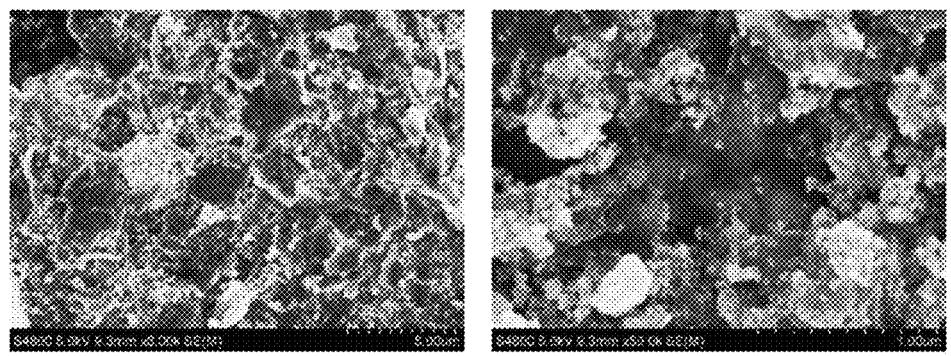
FIG. 1 is a scanning electron microscope (SEM) image of magnetic graphene oxide (MGO) according to Embodiment 1. It can be seen from FIG. 1 that the black part is graphene oxide (GO) with few electrons reflected, and the white particles are $Fe_3O_4$ with many electrons reflected. The prepared magnetic graphene oxide (MGO) has a layered folding structure peculiar to graphene oxide, which is advantageous for obtaining a larger BET adsorption area and more adsorption sites, and facilitates adsorption of spherical $Fe_3O_4$ on its surface. In the figure, the average diameter of the black GO sheet layers is 5 μm, and the average particle diameter of the white $Fe_3O_4$ is 20 nm. It shows that $Fe_3O_4$ has been successfully loaded on GO to form a magnetic material MGO.
Figure 2:
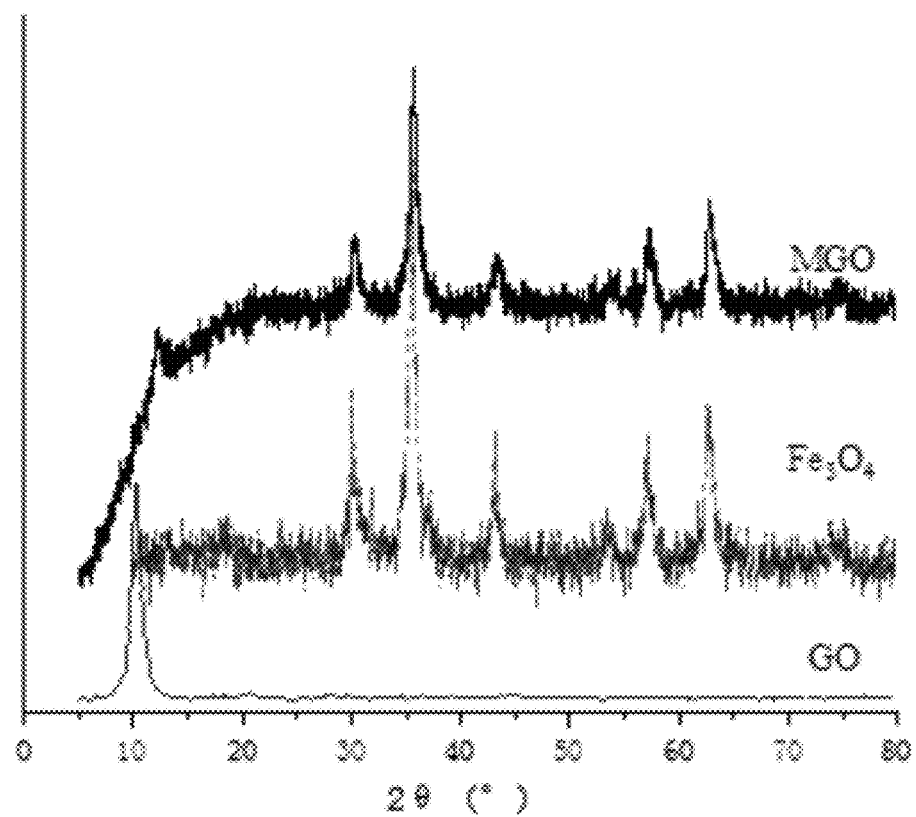
FIG. 2 is an X-ray diffraction (XRD) comparison diagram of the magnetic graphene oxide (MGO), graphene oxide (GO), and $Fe_3O_4$ nanospheres ($Fe_3O_4$) described in Embodiment 1. It can be seen from FIG. 2 that the 10.8° diffraction peak is a typical characteristic peak of GO. Among the 2θ angles of MGO diffraction peaks, 30.3°, 35.5°, 43.5°, 53.5°, 57.2°, and 62.8° are typical characteristic peaks of iron oxides, and are identical to the crystal plane of $Fe_3O_4$, indicating that $Fe_3O_4$ nanoparticles have been successfully loaded on GO, and this result is consistent with the analysis of SEM results. A weak characteristic peak similar to GO occurs at 12.1°, indicating that the interlayer spacing of MGO after loading $Fe_3O_4$ is reduced, due to the magnetic agglomeration of $Fe_3O_4$.
Figure 3:
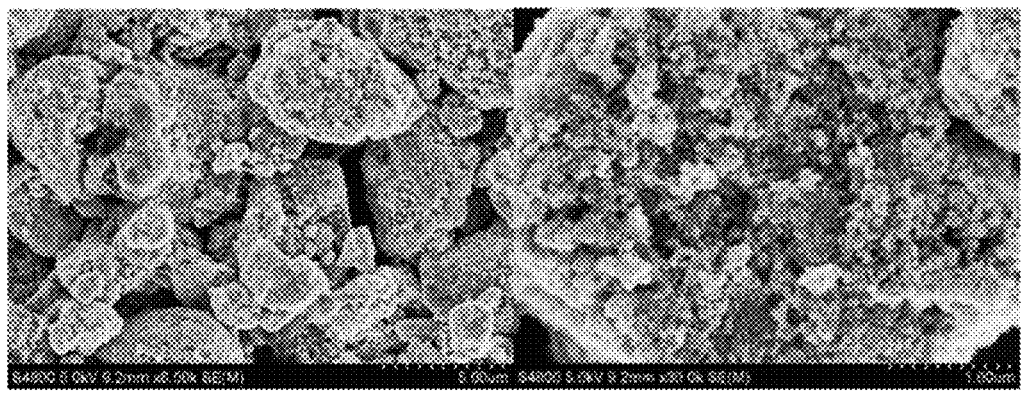
FIG. 3 is a scanning electron microscope (SEM) image of magnetic graphene oxide (MGO) formed when the added amount of $Fe_3O_4$ nanospheres is higher than the proportion relationship described in Embodiment 1. It can be seen from FIG. 3 that the $Fe_3O_4$ nanospheres have severe agglomeration, and the loading effect is not good.
Figure 4:
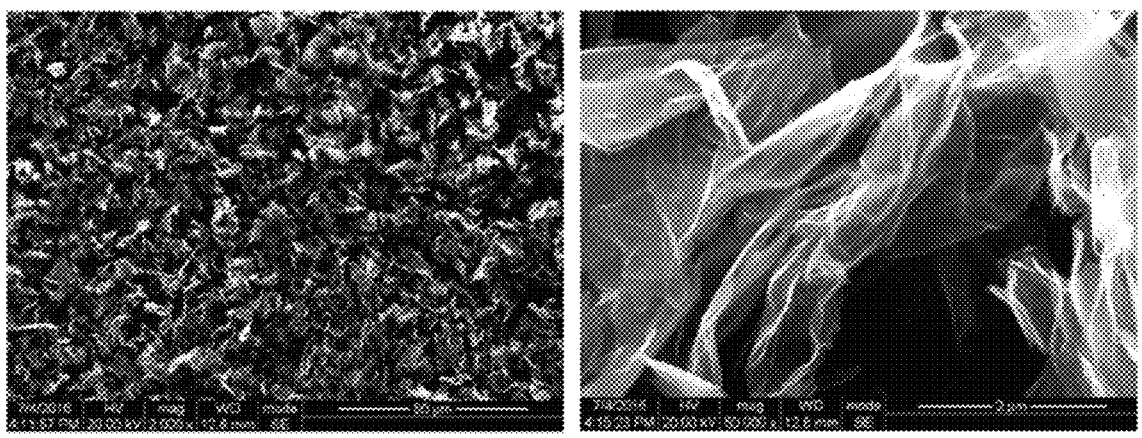
FIG. 4 is a scanning electron microscope (SEM) image of graphene oxide in Embodiment 1.

The present invention will be described in detail below through embodiments. $Fe_3O_4$ nanospheres were purchased from aladdin, and TEM tests showed that the $Fe_3O_4$ nanospheres had a purity of 99.0%, a diameter of 20 nm, and a spherical shape. Graphene oxide was purchased from Chinese Academy of Sciences in Chengdu, and had a purity of more than 98% by weight, 1-2 layers, an ash content of less than 1.5% by weight, and a diameter of 1-5 μm.

Embodiment 1

The viscosity reduction system for microwave extraction of heavy oil was a magnetic graphene oxide. The magnetic graphene oxide was compounded by $Fe_3O_4$ nanospheres and a graphene oxide. The $Fe_3O_4$ nanospheres were 0.5 g; and the graphene oxide was 0.25 g.

The diameter of the $Fe_3O_4$ nanospheres was 20 nm. The graphene oxide had 2 layers and a diameter of 5 μm.

A preparation method of the viscosity reduction system for microwave extraction of heavy oil included the following steps that:

(1) a catalyst suspension was prepared: 0.5 g of $Fe_3O_4$ nanospheres were added into 200 mL of deionized water to obtain a suspension, and the pH value of the suspension was adjusted to 3 by 1 mol/L hydrochloric acid to obtain a catalyst suspension;

(2) a carrier solution was prepared: 0.25 g of graphene oxide was added into 100 mL of deionized water, and the mixed solution was subjected to magnetic stirring at a temperature of 25° C. and a revolving speed of 500 rpm for 1 h to obtain a graphene oxide carrier solution;

(3) the catalyst suspension obtained in step (1) was placed in a three-necked flask, nitrogen was introduced into the flask at a flow rate of 0.5 L/min, and the flask was heated in a constant temperature water bath of 60° C.;

(4) the graphene oxide carrier solution was added into the flask heated in the constant temperature water bath of step (3) dropwise while intense stirring was kept at a revolving speed of 1000 rpm to obtain a mixed solution; wherein the graphene oxide carrier solution was 100 parts, and the catalyst suspension was 200 parts;

(5) the mixed solution obtained in step (4) was placed in an infiltration bag, and because the infiltration bag only allowed water molecules to pass through, but magnetic graphene oxide could not pass through the infiltration bag, so a magnetic graphene oxide precipitate was obtained; and (6) the magnetic graphene oxide precipitate obtained in step (5) was placed in a vacuum oven for vacuum drying at 50° C. to obtain the viscosity reduction system.

The following tested the application performance of the viscosity reduction system described in Embodiment 1 in heavy oil.

Figure 5:
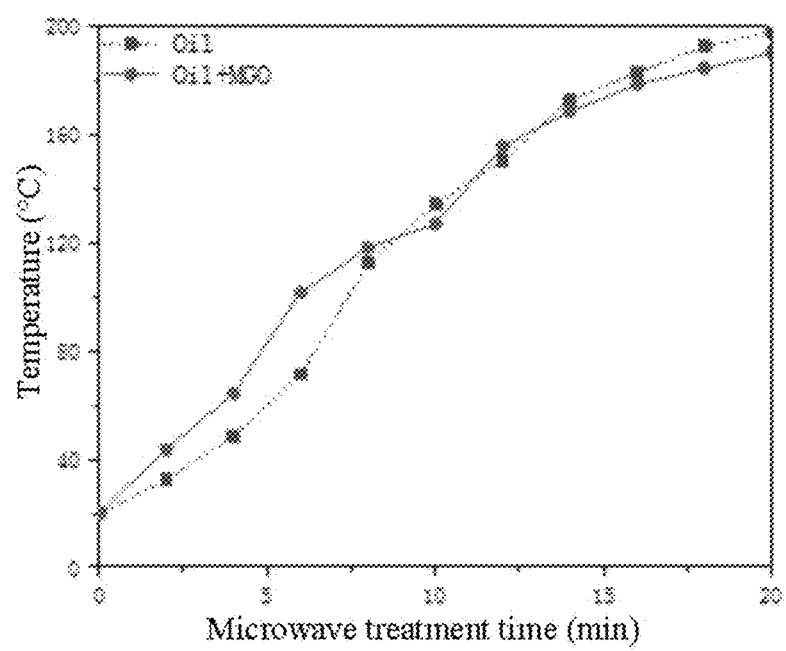
FIG. 5 is a comparison diagram of temperature rise changes of heavy oil with the use of magnetic graphene oxide nano-catalyst of Embodiment 1 in microwave treatment of heavy oil.

1. Test on the heating effect of heavy oil added with the magnetic graphene oxide (0.5 wt %) of the viscosity reduction system for microwave treatment was as follows:

Control groups were set: two groups of oil samples with the same initial condition were selected, one group did not contain additives, and the other group was added with 0.5 wt % of MGO. After 20 minutes of microwave treatment at a frequency of 2450 MHz and a power of 700 W, the temperature rise changes of the two groups of heavy oil were shown in FIG. 5.

The initial temperature of the heavy oil was 20° C. at room temperature, and the temperature gradually rose after microwave heating. Compared with the heavy oil added with MGO, it can be found that the temperatures of the heavy oil without MGO and the heavy oil added with 0.5 wt % of MGO tended to approach at about 10 min; the heating rate of the heavy oil added with 0.5 wt % of MGO was faster after 0 to 10 min of microwave heating, and the temperatures of the heavy oil without MGO and the heavy oil added with 0.5 wt % of MGO were close after 10 to 20 min of microwave heating. The reasons analyzed are that: MGO-supported catalyst $Fe_3O_4$ nanospheres were rapidly heated under microwave radiation, the heat was transferred to GO and surrounding contacted heavy oil, GO was converted into RGO with strong wave absorption, and the RGO assisted the catalyst $Fe_3O_4$ nanospheres to transfer heat to the heavy oil; the temperature of the heavy oil added with 0.5 wt % of MGO increased, and the light components were volatilized more quickly than those of the heavy oil not added with MGO, because the catalyst $Fe_3O_4$ nanospheres modified the nature of the original heavy oil containing a few light components under the action of microwaves to increase the content of light components, while the volatilization of light components was a heat absorption process.

Figure 6:
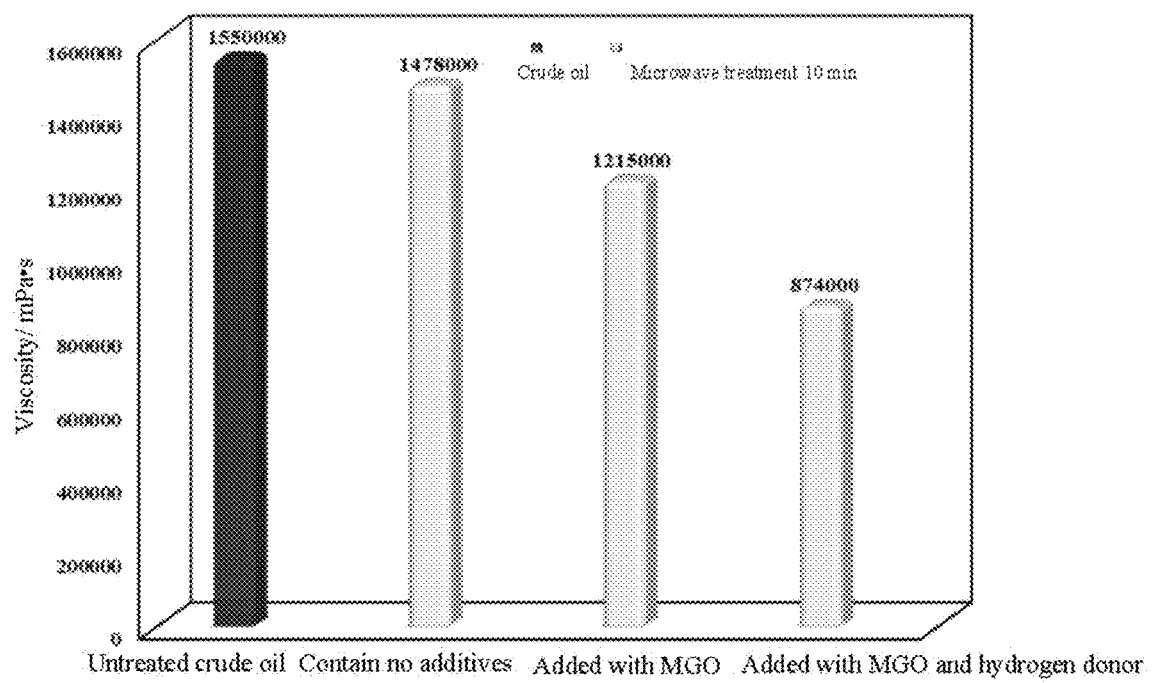
FIG. 6 is a comparison diagram of viscosity changes with the use of magnetic graphene oxide nano-catalyst of Embodiment 1 in microwave treatment of heavy oil.
Figure 7:
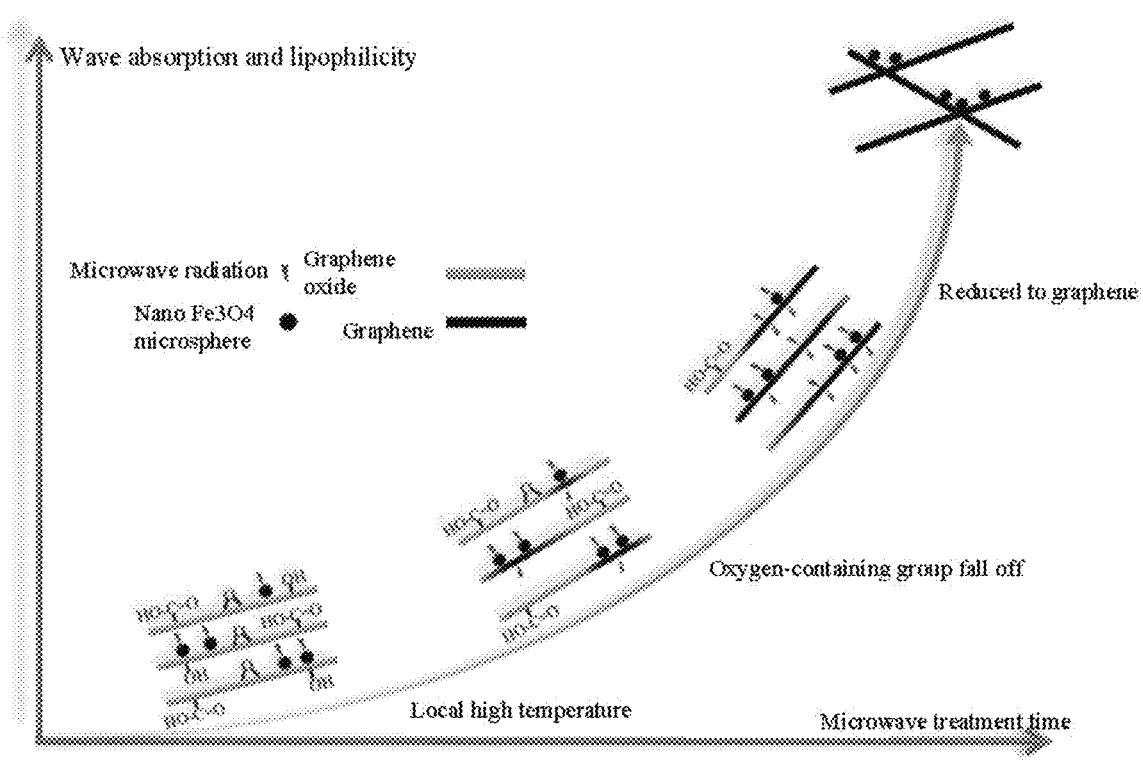
FIG. 7 is a schematic principle diagram showing that the graphene oxide is reduced to graphene with enhanced wave absorption and lipophilicity and functions of auxiliary heat transfer and automatic oil search.

2. Test on the viscosity reduction effect of heavy oil added with the magnetic graphene oxide (0.5 wt %) of the viscosity reduction system for microwave treatment was as follows:

Control groups were set: three groups of oil samples with the same initial condition were selected, one group did not contain additives, the other group was added with 0.5 wt % of MGO, and another group was added with 0.5 wt % of MGO and 1% wt of hydrogen donortetrahydronaphthalene ($C_{10}H_{12}$). After 10 minutes of microwave treatment at a frequency of 2450 MHz and a power of 700 W, the heavy oil was stood for 12 hours and cooled to room temperature, and the viscosity changes of the three groups of heavy oil were measured as shown in FIG. 6.

At a standard temperature of 25° C., the initial viscosity of the untreated heavy oil was 1550000 mPa·s, the viscosity of the heavy oil without MGO was 1478000 mPa·s after 10 minutes of microwave treatment, the viscosity reduction rate was 4.65%, and the viscosity did not decrease significantly; the viscosity of the heavy oil added with 0.5 wt % of MGO was 1215000 mPa·s after 10 minutes of microwave treatment, the viscosity reduction rate was 21.61%, and the viscosity decreased a little; and the viscosity of the heavy oil added with 0.5 wt % of MGO and 1% wt of hydrogen donor $C_{10}H_{12}$ was 874000 mPa·s after 10 minutes of microwave treatment, the viscosity reduction rate was 43.61%, and the viscosity decreased significantly. The heavy oil added with MGO had a significant viscosity reduction effect after microwave treatment, because of the combined effect of microwave thermal effect and non-thermal effect. In the process of heating heavy oil with microwaves, the non-thermal effect of microwaves first acted to reduce the activation energy for breakage of long chains and branched chains of some alkanes and cracking of unstable cements in the heavy oil, so that reaction and cracking occurred at a relatively low temperature to generate light components; when the temperature of the heavy oil system reached the cracking temperature of heavy components, the thermal effect of microwaves on the heavy oil was produced, and some heavy components such as colloid and asphaltene generated light components such as saturated and aromatic components through hydrogenation chain breaking reaction under superheated conditions, thereby reducing the viscosity of heavy oil.

3. Composition changes of heavy oil added with the magnetic graphene oxide (0.5 wt %) of the viscosity reduction system after 10 minutes of microwave treatment were shown in Table 2:

TABLE 2

| Composition changes of heavy oil | | | | |
|---|---|---|---|---|
| | Four components, wt % | | | |
| Sample | Saturated component | Aromatic component | Colloid | Asphaltene |
| Heavy oil | 21.92 | 44.18 | 23.57 | 10.33 |
| Microwave treatment for heavy oil | 21.38 | 44.15 | 23.96 | 10.51 |
| Heavy oil + MGO microwave treatment | 23.62 | 43.29 | 23.33 | 9.76 |
| Heavy oil + MGO + hydrogen donor microwave treatment | 24.18 | 45.16 | 22.27 | 8.39 |

The light components were saturated and aromatic components, and the heavy components were colloid and asphaltene. It could be found from Table 2 that, after microwave treatment for heavy oil, the four components were not changed significantly, and the proportion of heavy components increased slightly due to the volatilization of light components; after heavy oil+MGO microwave treatment, because local hotspots were generated around MGO, the generation of light components was slightly faster than the volatilization, and the heavy components were reduced slightly; and after heavy oil+MGO+hydrogen donor microwave treatment, some heavy components were hydrocracked to light components at a high temperature, and the amount of light components generated was relatively large, which also provided a basis for the phenomenon of modification and viscosity reduction.

What is claimed is:

1. A viscosity reduction system for microwave extraction of heavy oil, wherein the viscosity reduction system is a magnetic graphene oxide; wherein the magnetic graphene oxide is compounded by $Fe_3O_4$ nanospheres and a graphene oxide; wherein the mass ratio of the $Fe_3O_4$ nanospheres to the graphene oxide is 2:1;

the viscosity reduction system is produced by the following steps:
(1) preparing a catalyst suspension: adding the $Fe_3O_4$ nanospheres into deionized water to obtain a suspension, and adjusting the suspension to be acidic by an acid to obtain a catalyst suspension;
(2) preparing a carrier solution: adding graphene oxide into deionized water, and stirring to obtain a graphene oxide carrier solution;
(3) placing the catalyst suspension obtained in step (1) in a flask, introducing nitrogen into the flask, and heating in a constant temperature water bath of 60° C.;
(4) adding the graphene oxide carrier solution into the flask heated in the constant temperature water bath of step (3) dropwise while stirring to obtain a mixed solution; wherein the weight ratio of the graphene oxide carrier solution to the catalyst suspension is 1:2;
(5) placing the mixed solution obtained in step (4) in an infiltration bag to obtain a magnetic graphene oxide precipitate; and
(6) placing the magnetic graphene oxide precipitate obtained in step (5) in a vacuum oven for drying to obtain the viscosity reduction system.

2. The viscosity reduction system for microwave extraction of heavy oil according to claim 1, wherein the diameter of the $Fe_3O_4$ nanospheres is 10 to 20 nm.

3. The viscosity reduction system for microwave extraction of heavy oil according to claim 1, wherein the graphene oxide has 1 to 2 layers and a diameter of 1 to 5 μm.

4. The viscosity reduction system for microwave extraction of heavy oil according to claim 1, wherein in step (1), the $Fe_3O_4$ nanospheres are 0.4 to 1 g, and the deionized water is 200 mL; in step (2), the graphene oxide is 0.2 to 0.5 g, and the deionized water is 100 mL; and in step (4), the graphene oxide carrier solution is 100 parts by weight, and the catalyst suspension is 200 parts by weight.

5. The viscosity reduction system for microwave extraction of heavy oil according to claim 1, wherein in step (1), the $Fe_3O_4$ nanospheres are 0.5 g; and in step (2), the graphene oxide is 0.25 g.

6. The viscosity reduction system for microwave extraction of heavy oil according to claim 1, wherein in step (1), the pH value of the suspension is adjusted to 3 to 5 by 1 mol/L hydrochloric acid.

7. The viscosity reduction system for microwave extraction of heavy oil according to claim 1, wherein the stirring in step (2) is magnetic stirring, the revolving speed is 400 to 600 rpm, the stirring time is 0.5 to 1 h, and the stirring temperature is 20 to 30° C.; the flask in step (3) is a three-necked flask, and the inflow rate of nitrogen is 0.3 to 0.5 L/min; the stirring in step (4) is intense stirring, and the revolving speed is 800 to 1200 rpm; and vacuum drying is performed at 50° C. in step (6).

* * * * *